United States Patent [19]

Anhalt et al.

[11] Patent Number: 5,572,408
[45] Date of Patent: * Nov. 5, 1996

[54] CARD PERIMETER SHIELD

[75] Inventors: John W. Anhalt, Orange; William H. Doose, Anaheim Hills; William Galarza, Jr., Laguna Hills, all of Calif.

[73] Assignee: ITT Corporation, Secaucus, N.J.

[ * ] Notice: The term of this patent shall not extend beyond the expiration date of Pat. No. 5,333,100.

[21] Appl. No.: 422,811

[22] Filed: Apr. 17, 1995

Related U.S. Application Data

[63] Continuation of Ser. No. 292,143, Aug. 18, 1994, abandoned, which is a continuation of Ser. No. 226,093, Apr. 11, 1994, abandoned, which is a continuation of Ser. No. 906,179, Jun. 29, 1992, Pat. No. 5,333,100.

[51] Int. Cl.$^6$ .............................. H05K 1/14; H05K 9/00
[52] U.S. Cl. ..................... 361/737; 361/818; 361/752; 174/35 R; 174/51
[58] Field of Search ......................... 235/380, 441, 235/492; 174/35 R, 35 MS, 51; 361/736–737, 752, 753, 800, 816–818

[56] References Cited

U.S. PATENT DOCUMENTS

| | | |
|---|---|---|
| 3,200,261 | 8/1965 | Schwartz . |
| 3,372,310 | 3/1968 | Kantor . |
| 4,146,291 | 3/1979 | Goff et al. . |
| 4,386,388 | 5/1983 | Beun . |
| 4,532,419 | 7/1985 | Takeda . |
| 4,780,791 | 10/1988 | Morita et al. . |
| 4,789,347 | 12/1988 | Banjo et al. . |
| 4,821,146 | 4/1989 | Behrens et al. . |
| 4,872,091 | 10/1989 | Maniwa et al. . |
| 4,924,076 | 5/1990 | Kitamura . |
| 4,955,817 | 9/1990 | Sugai . |
| 5,017,767 | 5/1991 | Mizuno . |
| 5,031,076 | 7/1991 | Kiku . |
| 5,053,613 | 10/1991 | Onoda . |
| 5,107,404 | 4/1992 | Tam . |
| 5,124,888 | 6/1992 | Suzuki . |
| 5,207,586 | 5/1993 | MacGregor et al. ...................... 439/76 |
| 5,242,310 | 9/1993 | Leung ....................................... 439/76 |
| 5,299,940 | 4/1994 | Uenaka et al. ............................ 439/76 |
| 5,319,516 | 6/1994 | Perkins . |
| 5,333,360 | 7/1994 | Marsh et al. ............................... 439/76 |
| 5,398,154 | 3/1995 | Perkins et al . |
| 5,414,253 | 5/1995 | Baudouin . |

FOREIGN PATENT DOCUMENTS

| | | |
|---|---|---|
| 2057518 | 6/1993 | Canada . |
| 0417648 | 3/1991 | European Pat. Off. . |
| 4107191 | 4/1992 | Japan . |
| 2243493 | 10/1991 | United Kingdom . |
| 2248973 | 4/1992 | United Kingdom . |

*Primary Examiner*—Bot L. Ledynh
*Attorney, Agent, or Firm*—Thomas L. Peterson

[57] ABSTRACT

A data card is provided which has an electrically conductive rail (70, 72 FIG. 2) extending along its opposite sides and part of its rear, and connected to the ground plane (60) of a circuit board (46) of the card, to provide EMI (electromagnetic interference) shielding along the perimeter of the card. The rail has top and bottom edge portions (94, 96 FIG. 6) that are each bent into a U shape to extend around top and bottom ridges at the side of the card body to lock the rail in place. One edge portion includes a projecting tab (110) which is bent to extend inwardly and engage the ground plane (60) of the circuit board. The molded card body has a through hole (114) in its side portion, and the tab can extend into that hole before extending inwardly to the circuit board ground plane.

17 Claims, 4 Drawing Sheets

CARD PERIMETER SHIELD

CROSS REFERENCE

This is a continuation of U.S. patent application Ser. No. 08/292,143 filed Aug. 18, 1994, abandoned, which is a continuation of Ser. No. 08/226,093 filed Apr. 11, 1994, abandoned, which is a continuation of Ser. No. 07/906,179 filed Jun. 29, 1992 now U.S. Pat. No. 5,333,100 issued Jul. 26, 1994.

BACKGROUND OF THE INVENTION

Data cards are commonly constructed with a molded plastic body of moderate width and length such as 5.3 cm by 8.5 cm, but small thickness such as 5 mm. A circuit board assembly that is installed on the body, includes one or more integrated circuits that usually store data but may include only processing circuitry. Metallic top and bottom covers complete the card. Such data cards are especially useful in electronic equipment or devices of small thickness, such as lap top computers that may have a thickness of much less than one inch. Standard JEIDA cards have a thickness of five millimeters, which enables them to be inserted into thin slots of the electronic device.

While the top and bottom metallic covers provide good EMI (electromagnetic interference) shielding, there still can be considerable leakage through the perimeter of the card. A perimeter EMI shielding which added a minimal amount to the size of the card, and which was readily installable so it securely held to the molded body and was connected to the ground plane of the circuit board, and which preferably also helped to ground the covers, would be of value.

SUMMARY OF THE INVENTION

In accordance with one embodiment of the present invention, a data card is provided which has perimeter EMI (electromagnetic interference) shielding which does not substantially increase the dimensions of the card and which is easily installed to hold securely to the rest of the card and to be grounded to the ground plane of a circuit board of the card. The shielding includes at least one electrically conductive rail formed of sheet metal, the rail covering most of the area at one side of the card and being connected to the ground plane of the circuit board assembly of the card. Each body side is molded to have a pair of ridges at its top and bottom, and the sheet metal rail has top and bottom edge portions that are each bent in a substantially U shape to extend around each ridge. Each side of the card has a support wall for supporting a face of the circuit board and a locating wall extending around the board. One of the edge portions of the rail includes a projecting tab that extends to a location between the support wall and the ground plane that lies on a peripheral portion of the circuit board, to connect to the ground plane.

The side portion of the molded body preferably has a hole extending from its top to its bottom and lying immediately inside the ridges, and a tab of the rail extends through the slot before the tab is bent. The locating wall can have a slot through which the tab is bent to lie between the support wall and circuit board peripheral portion.

The novel features of the invention are set forth with particularity in the appended claims. The invention will be best understood from the following description when read in conjunction with the accompanying drawings.

DESCRIPTION OF THE PREFERRED EMBODIMENT

Figure 1:
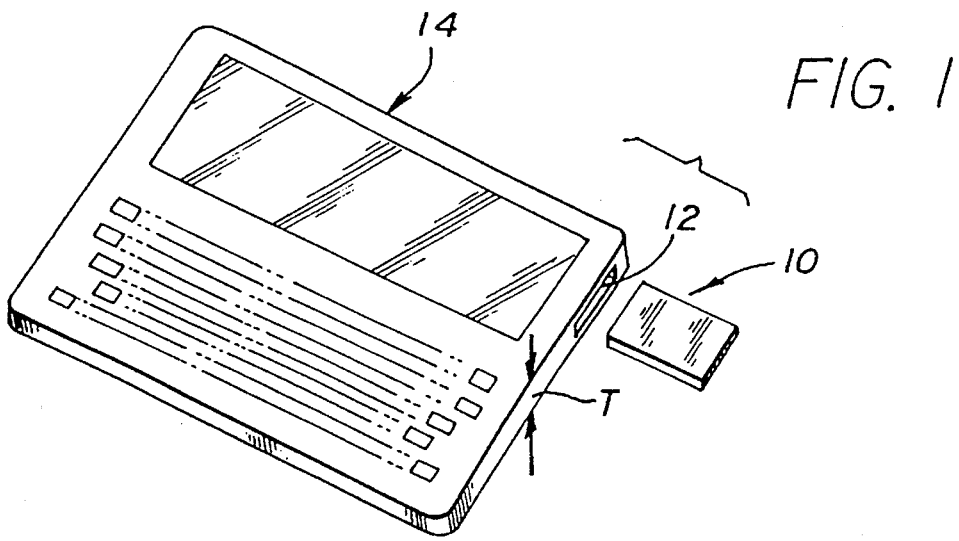
FIG. 1 is an isometric view of a data card of the present invention, showing it in conjunction with an electronic device which can receive it.
Figure 2:
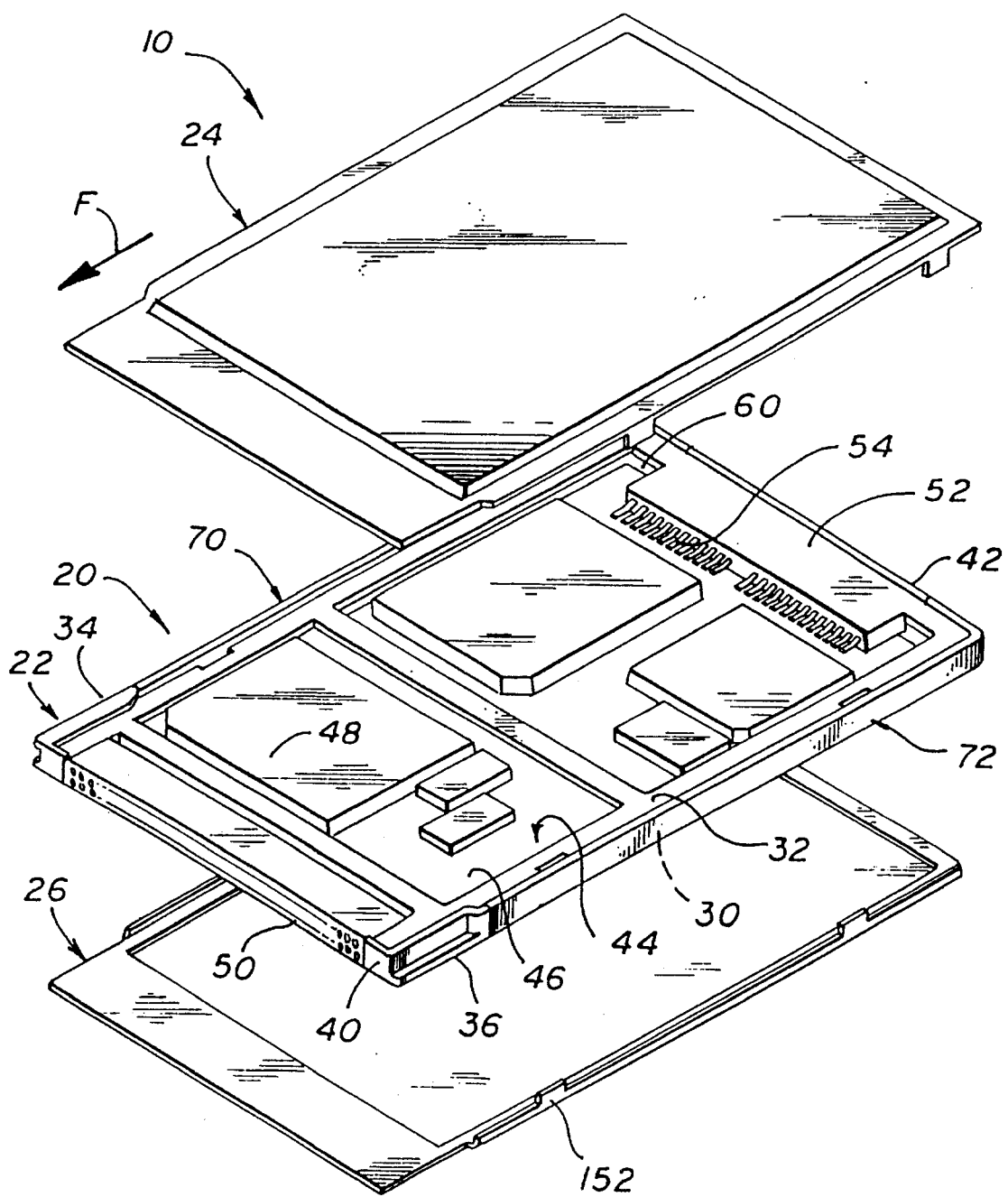
FIG. 2 is an exploded isometric view of the data card of FIG. 1.

FIG. 1 illustrates a data card 10 of the present invention, which is adapted to be inserted into a slot 12 of an electronic device 14. The particular device shown being a thin lap top computer. As shown in FIG. 2, the data card includes a frame 20 comprising a molded plastic body 22 and top and bottom covers 24, 26. The body 22 has a top and bottom 30, 32, first and second laterally spaced, opposite sides or side beams 34, 36, and forward and rearward ends 40, 42. A circuit board assembly 44 is mounted on the body 22, the assembly including a circuit board 46 and a plurality of electronic components including an integrated circuit component 48 mounted on the circuit board. Since the card 10 has an integrated circuit, it can be referred to as an IC card. A connector 50 mounted on the forward end of the body is connected to multiple traces on the board, of which at least some extend to the electronic components mounted on the board. When the data card 10 is moved in a forward direction F into an electronic device, contacts of the connector 50 engage corresponding contacts on the electronic device. In many cases, the integrated circuit components such as 48 store data. The particular data card shown include a rear connector 52 which can receive a miniature plug (not shown) to enable transmission of data between the card and an outside source (e.g. a modem), the connector having multiple contacts 54 engaged with multiple traces on the circuit board.

It is highly desirable to provide EMI (electromagnetic interference) shielding for the data card, to suppress the passage of signals into the card that might be picked up by circuitry in the card, and to suppress the radiation of signals by the card. When the card lies deep within an electronic device such as a lap top computer, it is especially important to suppress the transmission of signals from the card that might be picked up by circuitry in the electronic device. The top and bottom covers 24, 26 are formed of conductive material such as stainless steel, to provide good EMI shielding. However, prior data cards have not provided good shielding along the perimeter of the card, that is, the outside of the card between the top and bottom covers. The molded frame 22 is generally molded of material of low conductivity (at least about two orders of magnitude less than that of copper, and generally at least four orders of magnitude less).

Figure 3:
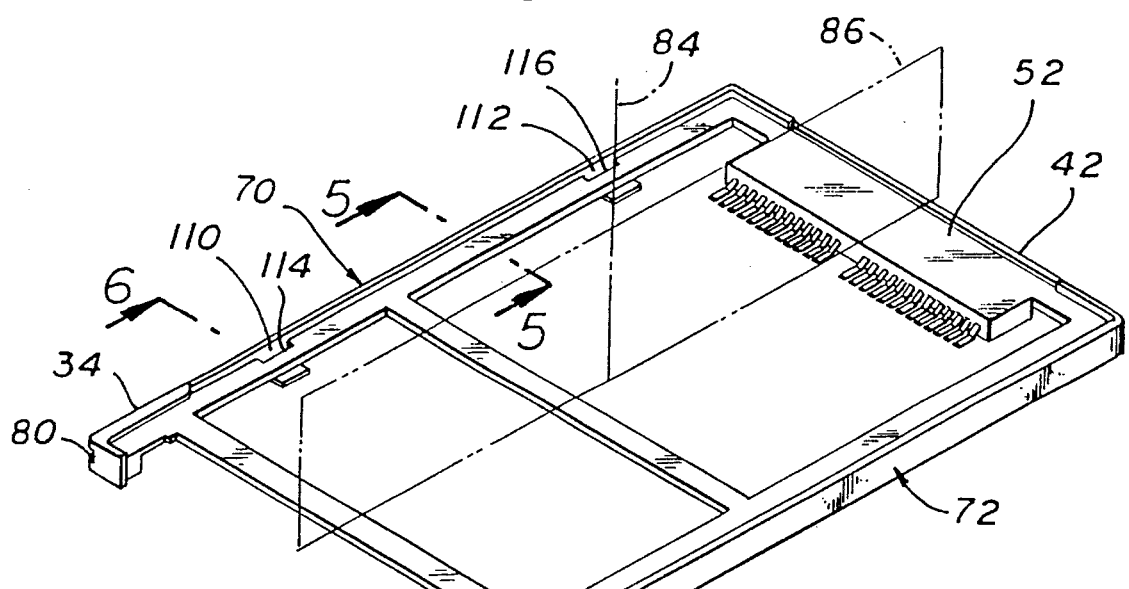
FIG. 3 is an isometric view of the body of the card of FIG. 2, with the shielding rails attached, but without the circuit board assembly or covers in place.
Figure 4:
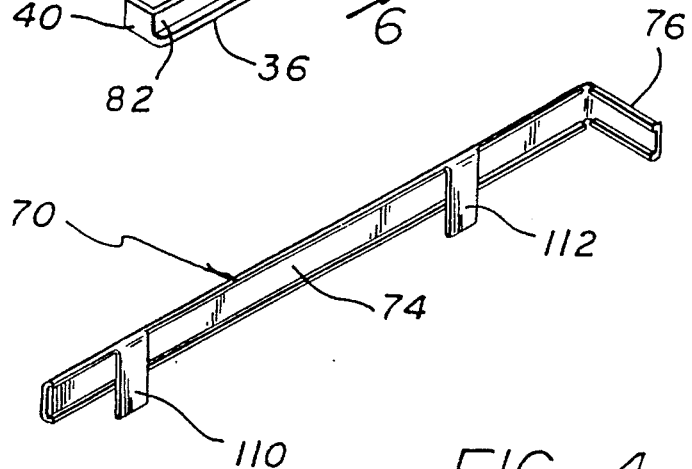
FIG. 4 is an isometric view of one of the rails of the card of FIG. 3, in its fully deformed position except for the tabs thereof.

In accordance with the present invention, EMI shielding is provided around much of the perimeter of the data card, by perimeter shield rails 70, 72. As shown in FIGS. 3 and 4, each rail such 70 is formed from sheet metal, as by forming it of 4 thousandth inch thick copper alloy which is gold plated. Each rail has a side portion 74 that extends along a corresponding side 34 of the body 22, and an end portion 76 which extends 90° from the side portion to extend along part of the rearward end 42 of the body. It would be feasible to use a single rail which extends around both the opposite sides 34, 36 and the rear end 42. However, the middle of the rear end is occupied by pin-receiving holes of the rear connector 52 which must receive pins of a mating connector, which makes it more difficult to use a single rail. The connector 52 can be formed with an EMI barrier structure, but the rails 70, 72 do not extend behind the connector. In a similar manner, the front connector (50 in FIG. 2) is not shielded by the rails, and the forward portions of each side are not shielded because of the need for polarizing keys 80, 82 at the front end. However, each rail such as 70 has a height slightly more than the height of the body 22 and a length more than half the length of the body (between its ends 40, 42) so each side rail covers most of the peripheral area at each side 34, 36 of the data card. In fact, each rail covers about 80% of the area of each side. The end portions 76 of the two rails cover about one third of the rear peripheral portion of the card. The data card has an imaginary vertical axis 84 that is equally spaced from its opposite sides and from its opposite ends, and has an imaginary longitudinal centerplane 86 lying halfway between the opposite sides 34, 36.

Figure 5:
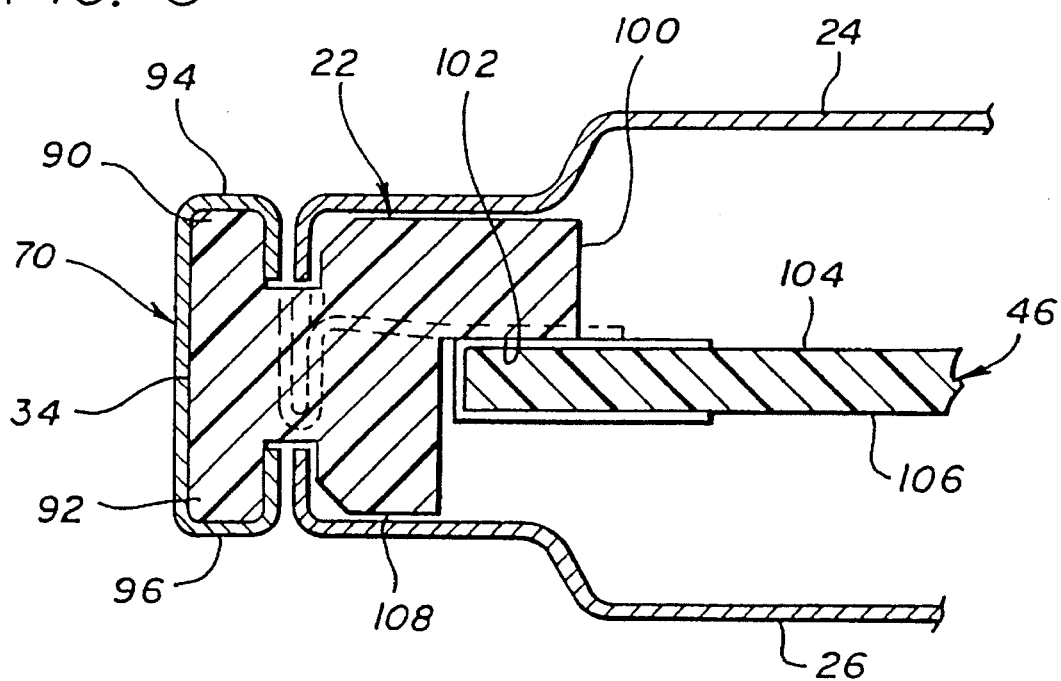
FIG. 5 is a partial sectional view taken on the line 5—5 of FIG. 3, but with the circuit board assembly and covers in place.
Figure 7:
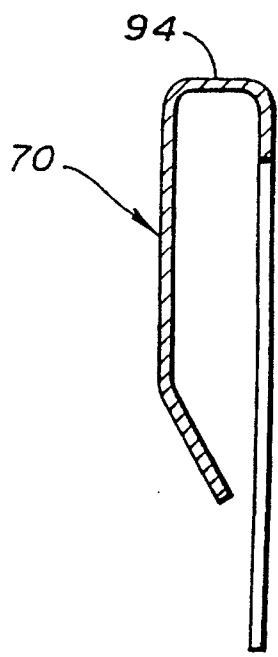
FIG. 7 is a sectional view of the rail of FIG. 4, prior to its installation on the card body.
Figure 8:
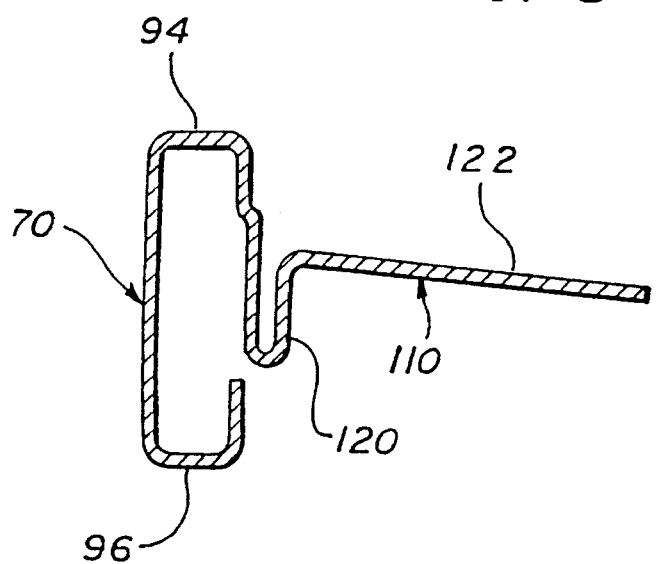
FIG. 8 is a sectional view of the rail of FIG. 7, taken through a tab thereof, showing it in its fully formed position.
Figure 6:
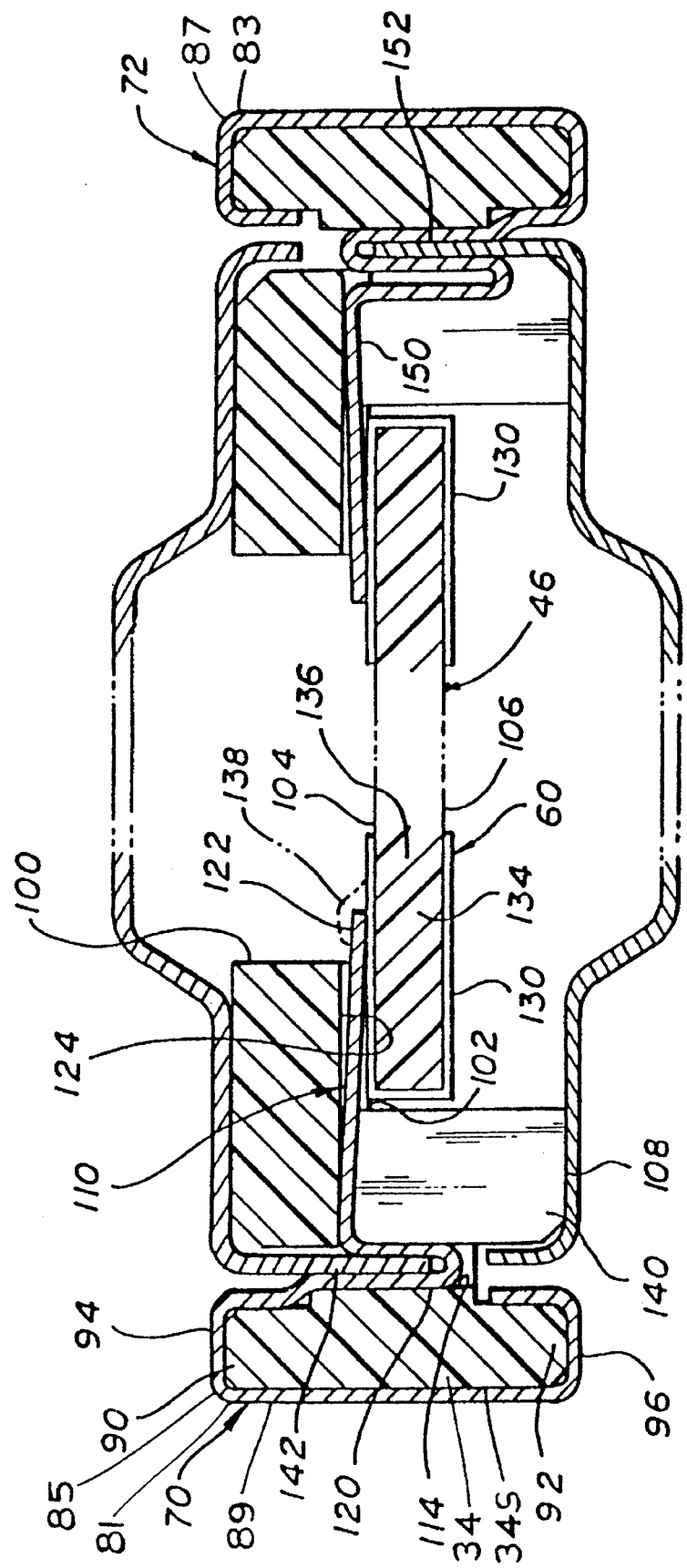
FIG. 6 is a sectional view taken on the line 6—6 of FIG. 3 with the circuit board assembly and covers in place.

As shown in FIG. 5, each body side such as 34 has top and bottom ridges 90, 92. The rail 70 has top and bottom edge portions 94, 96 that are each bent in a U shape to extend around each ridge, and thereby securely hold the rail to the body side. The body has a support wall 100 that forms a support surface 102 that supports the circuit board 46. There is substantial space between the top face 104 of the circuit board and the top cover 24, and between the bottom face 106 of the circuit board and the bottom cover 26. Electronic components on the circuit board can lie on and project from the top face and/or bottom face of the circuit board, and the space accommodates such projecting components. The body also forms a sideward locating wall 108 which closely surrounds the circuit board 46. As also shown in FIG. 6, the EMI shielding includes corner regions 81, 83 at the body opposite side portions. Each corner region includes a largely 90° bend 85, 87 and a top part 94 on one side of the bend, and a downwardly-extending part 89 on the other side of the bend. Each top part 94 lies above a corresponding body side portion such as side 34. Each downwardly-depending part 89 lies outside a corresponding body side portion, where the downwardly-depending part 89 is exposed. Each rail portion 70, 72 covers more than half of the area of the outer surface 34S of the body side 34.

As shown in FIGS. 3 and 6, the rail 70 has a pair of tabs 110, 112 which are designed to project down through a pair of through holes 114, 116 in the body side or side portion beam 34. Each tab is bent into a narrow U curve at 120, to leave a tab free end 122 extending along the bottom of the support wall 100. The free end 122 extends laterally, or inwardly (toward the longitudinal centerplane 86 and at least partially toward the axis 84). The support wall has a recess 124 for accommodating the free end of each tab, to enable the circuit board to lie securely against the support surface 102 and still allow the free end 122 of the tab to pass to a position to engage the circuit board 46. The ground plane, or ground conductor, 60 of the circuit board includes a peripheral portion 130 that extends on the top and bottom faces 104, 106 at the peripheral portion 134 of the board 136 of the circuit board. As a result, the free end 122 of the tab engages the peripheral portion 130 of the ground plane of the circuit board, to thereby connect the circuit board ground plane to the rail 70. It may be noted that the tab free end 122 will be soldered to the ground plane as indicated at 138. Also, the circuit board can be securely held to the body as by adhesive.

The locating wall 108 at the body side has a slot 140 at the location of each tab. The slot facilitates forming of the tab 110 after it is projected downwardly through the hole 114 in the body. After such downward projection, the tab is deformed as shown. The U curve 120 in the tab is useful to receive a projection 142 formed along the edge of the top cover 24. This serves to ground the top cover 24 as well as helping to hold the cover in place. It may be noted that the cover also can be held to the body by adhesive, and also can be grounded by a grounding contact comparable to contact 54A shown in FIG. 2.

The other rail 72 is attached to the body in a similar manner, except that its tabs such as 150 are differently bent as shown. The tab 150 engages the peripheral portion 130 of the circuit board ground plane and receives a bottom cover projection 152. The tabs can serve not only to ground the rail and the cover, but also to prevent shifting of the rail. Where the top and bottom covers are readily removable, the U loops of the tabs provide a means to help ground the tabs and help hold them in position.

Thus, the invention provides means for providing EMI (electromagnetic interference) protection along the periphery of a data card, in a low cost construction that adds minimally to the width and length of the card. This is accomplished by providing at least one electrically conductive rail formed of sheet metal that extends along at least one side of the body and covers more than half the height and length to thereby cover most of the area of the body side. The rail is electrically connected to the ground plane of the circuit board mounted in the body. Where a rear connector is provided on the data card, two rails are used, which each has a side portion covering most of the area at a corresponding side of the body of the card frame, and having a 90° bent end portion covering a portion of the rear end of the body. The body can be molded with top and bottom vertically extending ridges, and the rail can be formed with top and bottom edge portions that extend in substantially a U bend around each ridge. The rail can be provided with at least one tab extending from one of the edge portions, with the tab extending through a through hole formed in the body immediately inside the ridges. After the tab is projected downwardly through a hole, it is bent so a free end of the tab lies against a support wall that supports the circuit board assembly, and preferably lies in a recess in the support wall.

It should be noted that terms such as "top", "bottom", "vertical", etc. have been used herein only to aid in the description of the invention, and that the data card can be used in any orientation with respect to gravity.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An IC card which is designed for insertion into a slot of an electronic device that has contact elements, comprising:

a body molded of plastic material that has a conductivity at least about two orders of magnitude less than that of copper, said body having opposite side portions with outer surfaces and having opposite ends;

a connector portion at one of said body ends, said connector portion including a plurality of contacts for mating with the contact elements of the electronic device;

a circuit board assembly mounted on said body between said outer surfaces, said assembly including a board having a ground conductor, said board having an end with a plurality of conductive traces and said contacts each being engaged with one of said traces; and electrically conductive EMI shielding which includes top and bottom sheet metal cover portions lying respectively above and below said circuit board assembly and a plurality of sheet metal rail portions lying outside of said body opposite side portions, each of said rail portions covering more than half of the area of the outer surface of a corresponding one of said body side portions, with said cover portions and said rail portions being electrically connected to said ground conductor of said circuit board, and with said shielding including corner regions each lying adjacent to one of said body opposite side portions, with each corner region including a largely 90° bend and a top part on one side of the bend and a downwardly-extending part on the other side of the bend, with each of said top parts lying above a corresponding body side portion and with each downwardly-extending part lying outside of a corresponding body side portion and forming one of said rail portions that covers more than half of the area of the outer surface of the corresponding body side portion.

2. The IC card described in claim 1 wherein:

said rail portions each covers substantially the entire area of the corresponding body side portion.

3. The IC card described in claim 1 wherein:

said shielding includes an integral laterally extending tab lying adjacent to one of said opposite body side portions, with said tab having a free end engaging said ground conductor.

4. An IC card which is designed for insertion into a slot of an electronic device that has contact elements, wherein the IC card includes an insulative body having opposite side portions with opposite body outer surfaces and opposite ends, a circuit board assembly which is mounted on said body and which includes a board having a ground conductor and at least one circuit component mounted on said board, said board having an end with a plurality of conductive traces, and including a connector lying at one of said body ends and having a plurality of contacts engaged with said traces for mating with the contact elements of the electronic devices, characterized by:

sheet metal EMI shielding substantially enclosing said circuit board, said shielding including top and bottom cover portions lying respectively above and below said circuit board assembly, and side rail portions lying outside of and extending along said body opposite side portions and substantially covering said opposite body outer surfaces, with said cover portions and said side rail portions being electrically connected together and to said ground conductor.

5. An IC card comprising:

a molded plastic body with a top and a bottom, laterally-spaced opposite sides, and forward and rearward ends;

a circuit board assembly having a circuit board with at least one circuit component thereon, said circuit board having forward and rearward end portions, laterally spaced opposite sides, and upper and lower surfaces, with one of said end portions having a row of traces thereon, said circuit board having a ground plane conductor lying adjacent to at least one of said opposite sides;

said circuit board assembly being mounted on said body;

a connector at one end of said body having contacts engaging said traces on said circuit board;

EMI shielding which includes top and bottom sheet metal cover portions mounted on said body and lying respectively above and below a majority of said circuit board assembly, said cover portions having side edges extending laterally beyond said opposite sides of said circuit board and having pans that extend vertically and that lie beyond corresponding sides of said circuit board assembly and that cover a majority of said opposite sides of said circuit board; and a tab electrically connected to at least one of said cover portions at substantially one of said side edges thereof, said tab having a length which is less than half the length of the circuit board and having a width that is less than half the width of the circuit board and which extends largely laterally and which has a free end that directly engages said ground conductor.

6. A combination of components which when assembled form an IC card housing for holding a circuit board assembly that includes a circuit board and components on the circuit board, wherein the circuit board has front and rear end portions and a row of traces at at least one of said end portions, said combination comprising:

an insulative body with a top and a bottom, opposite sides, and forward and rearward ends, said opposite sides each having a length separated by said ends and a height separated by said top and bottom, said body being adapted to support the circuit board assembly;

a plurality of contacts at one end of said body for engaging traces on the circuit board; and an EMI shield for substantially enclosing said circuit board, said shield including top and bottom sheet metal cover portions for lying respectively above and below a majority of said circuit board assembly, and a plurality of sheet metal rail portions adapted to extend along and outside said opposite sides of said body, with each of said rail portions being long and high enough to cover a majority of the area of a corresponding body side, and with said rail portions extending between said top and bottom cover portions.

7. The combination described in claim 6 wherein:

said EMI shield has a pair of corner regions that each includes a largely 90° bend, a top part for lying on one side of said bend and over the top of said body at a corresponding one of said body sides, and a downwardly-extending part for lying on the other side of the bend and outside a majority of a corresponding one of said sides of said body to form one of said rail portions.

8. The combination described in claim 6 wherein:

said shield includes an integral laterally extending tab lying adjacent to one of said opposite sides of said body for engaging a ground conductor on the circuit board.

9. An IC card which has front and rear ends and opposite sides, comprising:

a circuit board assembly having a circuit board with at least one circuit component on said board, said circuit board having forward and rearward board end portions, opposite board sides, and upper and lower board surfaces, with one of said end portions having a row of conductive traces thereon;

insulative side beams extending along said opposite board sides to support said circuit board assembly;

an electrical connector positioned between said side beams adjacent to said one end portion of said circuit board, said connector having contacts electrically connected to said traces;

an EMI shield substantially enclosing said circuit board assembly, said shield including top and bottom sheet metal cover portions lying respectively above and below a majority of said circuit board assembly, and sheet metal rail portions extending along a majority of the outside of said side beams and forming more than half of the opposite sides of the IC card;

said EMI shield being attached to said side beams.

10. The IC card described in claim 9 wherein:

said EMI shield includes a bent portion partially covering the other of said end portions of said circuit board.

11. The IC card described in claim 9 wherein:

a second electrical connector is positioned between said side beams adjacent to the other of said end portions of said circuit board;

said other end portion of said circuit board has a second row of conductive traces thereon;

said second connector has a row of second contacts, said second contacts being electrically connected to said traces of said second row of traces;

said row of second contacts being spaced from said side beams to provide an end area between each of said side beams and said second row of contacts; and said EMI shield includes end portions lying at said end areas outside of said other end portion of said circuit board.

12. The IC card described in claim 9 wherein:

a ground conductor is provided on said circuit board; and said EMI shield includes a tab that is integral with one of said sheet metal rail portions and that directly engages said ground conductor.

13. The IC card described in claim 9 wherein:

said rail portions comprise continuous perimeter shield sections covering substantially the entire length and height of said side beams.

14. The IC card described in claim 9 wherein:

said EMI shield includes corner regions that each includes a largely 90° bend and a horizontal top part on one side of the bend and a downwardly-extending part on the other side of the bend, with each of said rail portions forming one of said downwardly-extending parts.

15. An IC card which is designed for insertion into a slot of an electronic device that has contact elements, wherein the IC card has front and rear ends separated by the length of the IC card and having opposite sides, comprising:

a circuit board assembly having a circuit board with a ground conductor and at least one circuit component on said board, said circuit board having forward and rearward board end portions, opposite board sides, and upper and lower board surfaces with one of said end portions having a row of conductive traces thereon;

an electrical connector lying adjacent to one of said end portions of said circuit board, said connector having contacts engaged with said traces and designed to engage the contact elements of the electronic device; and an EMI shield substantially enclosing said circuit board assembly, said shield including top and bottom sheet metal cover portions lying respectively above and below a majority of said circuit board assembly, and a plurality of sheet metal rail portions extending along a majority of said opposite sides of said circuit board assembly, with said cover portions and said rail portions all being electrically connected to said ground conductor, and with each rail portion being exposed at a corresponding side of the IC card and forming more than half of the corresponding side of the IC card;

said shield includes corner regions that each includes a largely 90° bend and a top part on one side of the bend and a downwardly-extending part on the other side of the bend, with each of said rail portions forming one of said downwardly-extending parts.

16. The IC card described in claim 15 wherein:

said shield includes a laterally extending tab that is integral with one of said rail portions and that directly engages said ground conductor.

17. The IC card described in claim 5, wherein:

said parts of said cover that lie beyond corresponding sides of said circuit board assembly, have sections lying beyond corresponding opposite sides of said body.

* * * * *

UNITED STATES PATENT AND TRADEMARK OFFICE
CERTIFICATE OF CORRECTION

PATENT NO. : 5,572,408
DATED : November 5, 1996
INVENTOR(S) : John W. Anhalt, William H. Doose and William Galarza, Jr.

It is certified that error appears in the above-identified patent and that said Letters Patent is hereby corrected as shown below:

On the title page, item [54], should read "IC CARD PERIMETER SHIELD";

Column 1, line 1, --IC-- should be inserted before "CARD PERIMETER SHIELD";

Column 3, line 60, --portion-- should be deleted;

Column 6, line 21, "pans" should read --parts--;

Column 6, line 29 --,-- should be inserted after "board".

Signed and Sealed this

Seventh Day of January, 1997

Attest:

BRUCE LEHMAN

*Attesting Officer*     *Commissioner of Patents and Trademarks*